United States Patent
Sparks et al.

[11] Patent Number: 6,022,756
[45] Date of Patent: *Feb. 8, 2000

[54] METAL DIAPHRAGM SENSOR WITH POLYSILICON SENSING ELEMENTS AND METHODS THEREFOR

[75] Inventors: Douglas Ray Sparks, Kokomo; Andres Deogracias Viduya, Carmel; Lewis Henry Little, Peru; Marion Edmond Ellis, Kokomo, all of Ind.

[73] Assignee: Delco Electronics Corp., Kokomo, Ind.

[*] Notice: This patent is subject to a terminal disclaimer.

[21] Appl. No.: 09/127,291

[22] Filed: Jul. 31, 1998

[51] Int. Cl.$^7$ .................................................. H01L 21/00
[52] U.S. Cl. ................................................................ 438/53
[58] Field of Search .................. 438/53; 73/726, 73/727; 338/2, 42, 47, 13

[56] References Cited

U.S. PATENT DOCUMENTS

| | | | |
|---|---|---|---|
| 3,938,175 | 2/1976 | Jaffe et al. | 357/26 |
| 4,003,127 | 1/1977 | Jaffe et al. | 29/580 |
| 4,016,644 | 4/1977 | Kurtz | 438/53 |
| 4,618,397 | 10/1986 | Shimizu et al. | 438/53 |
| 4,657,775 | 4/1987 | Shioiri et al. | 427/38 |
| 4,809,555 | 3/1989 | Kunz | 73/727 |
| 4,966,039 | 10/1990 | Dell'Acqua | 73/727 |
| 4,982,351 | 1/1991 | Kawate et al. | 364/571.01 |
| 5,242,863 | 9/1993 | Xiang-Zheng et al. | 438/53 |
| 5,518,951 | 5/1996 | Paynter et al. | 438/53 |
| 5,672,551 | 9/1997 | Fung | 438/53 |
| 5,736,430 | 4/1998 | Seefeldt et al. | 438/53 |
| 5,846,287 | 10/1998 | Hassan et al. | 438/53 |
| 5,867,886 | 2/1999 | Ratell et al. | 73/727 |

OTHER PUBLICATIONS

White, An Assessment of Thick–Film Piezoresistors on Insulated Steel Substrates, Hybrid Circuits No. 20, (Sep. 1989) pp. 23–27.

Yamazaki et al., Pressure Sensors Prepared with Heavily Boron Doped Polycrystalline Silicon Films by Plasma Assisted Chemical Vapour Deposition, Proceedings of the 5th Sensor Symposium, (1985), pp. 153–157.

Okuyama, et al., Smooth–Faced Porcelain Enameled Steel Substrate and its Application to Pin Grid Array, ISHM '88 Proceedings, pp. 184–188.

Hugh, Multilayer Thick–Film Circuits on Porcelainized Steel Substrates, ISHM 80, pp. 326–330.

Lindner, et al, Porcelainized Steel Substrate Technology: State–of–the Art Considerations in its Application ISHM 80, pp. 88–98.

*Primary Examiner*—Savitri Mulpuri
*Attorney, Agent, or Firm*—Jimmy L. Funke

[57] ABSTRACT

A sensor (10) having polysilicon strain-sensing elements (20) on a metal diaphragm (16). A thick-film insulating layer (18) covers the metal diaphragm (16), and thin-film polysilicon resistive elements (20) are formed on the thick-film insulating layer (18). Thick-film conductors (22) are formed on the thick-film insulating layer (18) and contact the thin-film polysilicon resistive elements (20) to form electrical interconnects to the resistive elements (20). The thick-film conductors (22) preferably contain silicon in order to reduce diffusion of silicon from the polysilicon resistive elements (20). The thick-film insulating layer (18) may be made up of a number of individual thick-film layers, the uppermost of which is stable and nonreactive with the thin-film polysilicon resistive elements (20) and the thick-film conductors (22) at temperatures of at least 600° C. A passivation layer (24) overlies the thin-film polysilicon resistive elements (20) and the thick-film conductors (22). The sensor (10) can be made sufficiently rugged to be used as a structural member of a fluid-containing vessel.

2 Claims, 2 Drawing Sheets

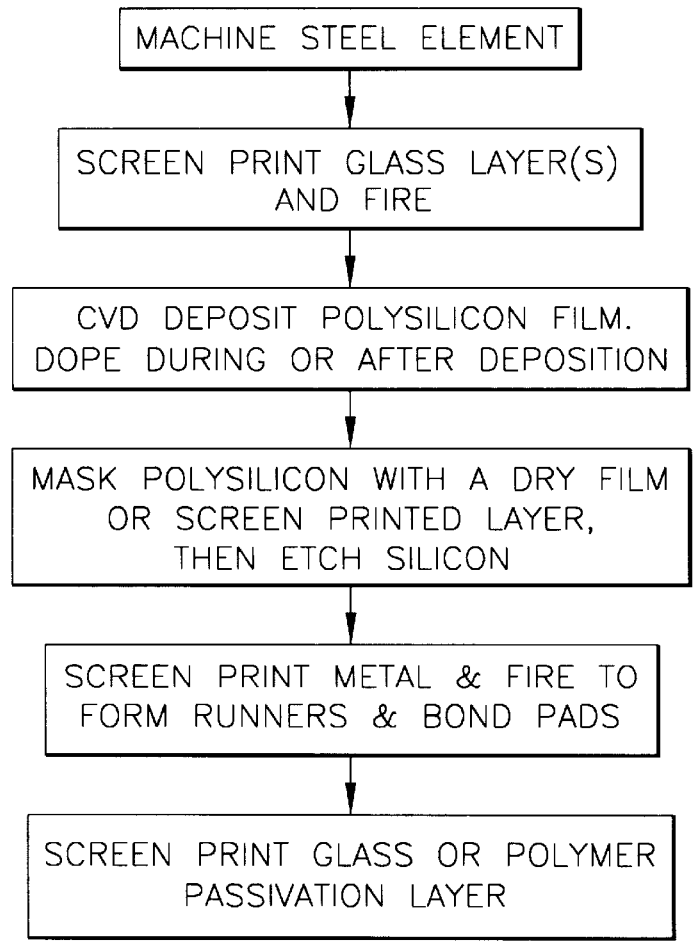
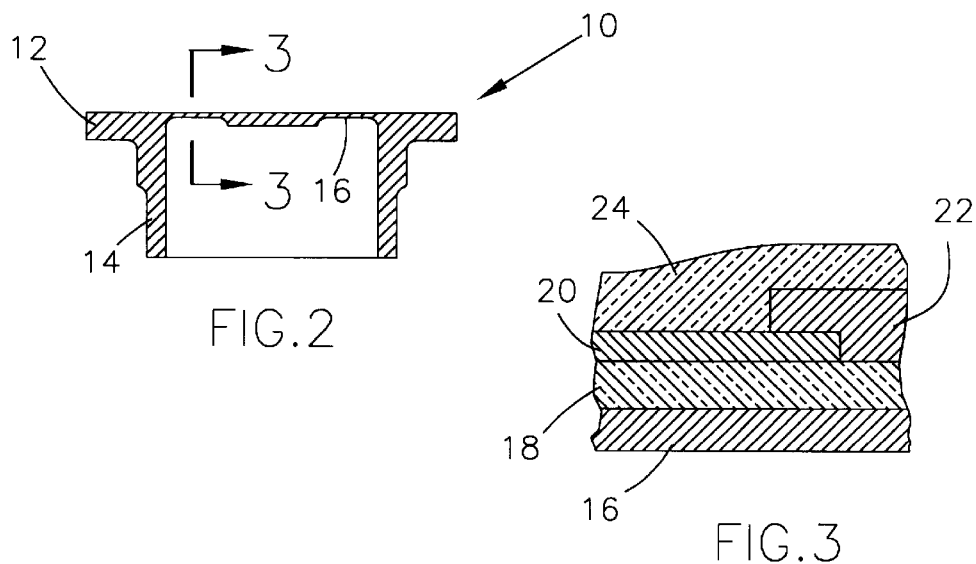

METAL DIAPHRAGM SENSOR WITH POLYSILICON SENSING ELEMENTS AND METHODS THEREFOR

FIELD OF THE INVENTION

The present invention generally relates to sensing devices and methods for their production. More particularly, this invention relates to a sensor with a metal diaphragm that combines thick-film and thin-film processes in a manner that enables the sensor to be mass produced.

BACKGROUND OF THE INVENTION

There is a continuous effort to develop sensors that are lower in cost and capable of being mass produced, yet characterized by high reliability, sensitivity and linearity. Sensors finding wide acceptance on the basis of furthering these characteristics include those that utilize semiconductor materials with a micromachined sensing diaphragm, a notable example being micromachined single-crystal silicon pressure transducer cells manufactured using semiconductor fabrication processes. In the processing of such cells, a thin diaphragm is formed in a silicon wafer through preferential chemical etching. Ion implantation and diffusion techniques are then used to drive doping elements into the diaphragm, forming piezoresistive elements whose electrical conductivity changes with strain such that deflection of the diaphragm causes a change in resistance value of the piezoresistive elements, which can then be correlated to the magnitude of the pressure applied to the diaphragm.

Diaphragms of single-crystal silicon pressure transducer cells are typically small, rarely exceeding a few millimeters in width, and are very thin, with a thickness of often less than 100 micrometers. The use of standard single-crystal silicon wafers and standard semiconductor device fabrication processes allows many such cells to be fabricated from a single wafer, providing some economy of scale. However, silicon is susceptible to chemical attack and erosion by various media, particularly in applications where a high-pressure medium is to be sensed, e.g., automotive applications that involve sensing brake fluid, oil, coolant, transmission fluid, hydraulic fluid, fuel and steering fluid pressures at pressures of two atmospheres or more. For such applications, a pressure sensor must also be physically rugged and resistant to the hostile environment of the sensed medium, necessitating that a micromachined silicon pressure transducer cell include some form of protection in order to realize its advantageous operational characteristics in the chemically hostile environment.

Current methods for producing media-compatible sensors include enclosing a silicon sensing chip in an inert fluid, such as a silicone oil or gel, and then further separating the sensing chip from the medium to be sensed with a metal diaphragm, such that pressure must be transmitted through the metal diaphragm and fluid to the sensing chip. While achieving some of the operational advantages of silicon pressure transducer cells, the manufacturing processes for these sensors, and hence the sensors themselves, are relatively expensive and complicated. As a result, these sensors are not suitable as mass-produced sensors for automotive applications. Furthermore, the influence of the fluid in contact with the silicon pressure transducer cell over the operating temperature range and over time is of sufficient magnitude to require complex electronics to separate their effect on the silicon pressure transducer cell from the effect of pressure.

Another approach is to form a capacitor plate on a ceramic diaphragm, which is then bonded to a base with a second capacitor plate. The use of a chemically-resistant and mechanically-tough ceramic materials, such as aluminum oxide or zirconium oxide, allows the diaphragm to directly contact the medium whose pressure is to be measured, thereby eliminating the requirement for protective packaging. As the ceramic diaphragm deflects under the influence of pressure, the gap between the capacitor plates changes, causing a corresponding change in capacitance that can be correlated to the applied pressure. However, the circuit required to detect capacitance changes is somewhat complex and subject to noise corruption. In addition, attaining an adequate seal between the ceramic diaphragm and base for high pressure applications can be difficult.

Yet another approach employing a chemically-resistant ceramic diaphragm uses thick-film piezoresistors that are screen printed on the diaphragm, thereby providing for pressure sensing in the same manner as described above for single-crystal silicon pressure transducer cells. As with ceramic capacitive pressure sensors, the ceramic material is chosen to allow direct contact with the medium whose pressure is to be sensed, eliminating the need for protective packaging. While the signal detection circuitry used is less complicated than that for the capacitive sensor, the difficulty of reliably sealing the ceramic diaphragm with a base is the same as that for the capacitive sensors in high-pressure applications.

Finally, other media-compatible sensors known in the prior art employ a metal diaphragm as the sensing element. Because metal diaphragms generally deflect more for a given thickness and pressure than ceramic diaphragms, which exhibit lower elongations before breaking and are therefore designed to deflect less under pressure, sensing is performed by thin-film polysilicon resistors. The metal diaphragm is first coated with a thin-film layer of typically silicon dioxide or silicon nitride to electrically insulate the diaphragm from the thin-film resistors and their associated conductors. A thin-film polysilicon layer is then deposited on the insulating layer by chemical vapor deposition (CVD), and then etched through a mask formed by spinning a liquid photoresistive material onto the polysilicon layer, and then exposing and developing the photoresistive material to obtain the pattern required for the resistors. Thin-film conductors are then formed by evaporation.

The equipment necessary to deposit the insulating and polysilicon layers is expensive, and deposition rates are extremely slow. Deposition of the thin-film layers requires multiple patterning, exposure, developing and stripping steps for the required thin-film spun-on photoresists and metallization, and must be carried out in a controlled environment to assure that no air borne particles are present on the surface to be coated. In addition, such processes typically deposit thin-films no thicker than about 10,000 angstroms, necessitating that the surface of the metal diaphragm be extremely smooth to avoid rough surface features penetrating through or producing discontinuities in the deposited thin films.

In view of the above, metal diaphragm sensors have also been produced with thick-film metal oxide resistors. A thick-film oxide layer is formed by printing and firing a thick-film ink, after which a thick-film metal oxide layer is printed and fired on the insulating layer to form the resistors. Thick-film conductors are also typically employed with this type of sensor. A drawback with this technology is that thick-film resistors tend to have lower and less reproducible gauge factors than thin-film polysilicon resistors, and the output of such resistors can vary significantly with temperature and sheet resistivity.

From the above, it can be seen that further improvements in sensors are desired, particularly for sensors that are compatible with corrosive, high-pressure media, yet are relatively uncomplicated, low in cost, and characterized by high reliability and sensitivity.

SUMMARY OF THE INVENTION

It is an object of this invention to provide a sensor that combines the media compatibility of metal diaphragms with the high sensitivity of thin-film polysilicon strain-sensing elements.

It is another object of this invention that such a sensor can be readily mass produced as compared to prior art sensors.

It is yet another object of this invention to provide a process for producing such a sensor.

In accordance with a preferred embodiment of this invention, these and other objects and advantages are accomplished as follows.

The present invention provides a sensor that employs polysilicon strain-sensing elements on a metal diaphragm, yielding a sensor capable of accurately sensing very high pressures, loads or strains. The sensor of this invention generally includes a metal body having a metal diaphragm supported by a base. To facilitate processing, the metal diaphragm preferably has a notch in its perimeter or has a square shape in order to maintain proper alignment of the diaphragm during processing. A thick-film insulating layer covers the metal diaphragm, and thin-film polysilicon resistive elements are formed on the thick-film insulating layer. Thick-film conductors are formed on the thick-film insulating layer and contact the thin-film polysilicon resistive elements to form electrical interconnects to the resistive elements. The thick-film conductors preferably contain silicon in order to reduce diffusion of silicon from the polysilicon resistive elements. The thick-film insulating layer may be made up of a number of individual thick-film layers, the uppermost of which is stable and nonreactive with the thin-film polysilicon resistive elements and the thick-film conductors at temperatures of at least 600° C. Finally, a thick-film passivation layer overlies the thin-film polysilicon resistive elements and the thick-film conductors.

The metal body of sensors having the above construction can be made sufficiently rugged to be used as a structural member of a fluid-containing vessel. In such an embodiment, signal conditioning circuitry that compensates the output of the sensing elements for temperature can also be formed on the metal body. Furthermore, the metal body can be fabricated to include any number of metal diaphragms, each coated with the printed thick-film insulating layer and each having thin-film polysilicon resistive elements with associated thick-film conductors.

According to this invention, sensors having the above construction are produced using the specified combination of thin-film and thick-film processes to yield pressure and strain sensors that combine the advantages of a media-compatible metal diaphragm, the sensitivity of polysilicon strain-sensing elements, and the lower cost of thick-film processes. The preferred square-shaped or notched diaphragms maintain proper alignment of the diaphragm during processing. Combined with a symmetrical resistor pattern, this aspect of the invention eliminates the time-consuming practice of ensuring proper orientation of the diaphragms as they are loaded into fixtures for each process level. Finally, the invention makes possible a mass-produced sensor that can be fully integrated with its signal conditioning circuitry into a structural component, such as a vessel that contains a fluid whose pressure is to be sensed by the sensor.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1 is a process flow chart for manufacturing a metal diaphragm pressure sensor in accordance with the present invention;

FIG. 2 is a cross-sectional view of a metal diaphragm pressure sensor assembly in accordance with this invention;

FIG. 3 is a detailed cross-sectional view of the sensor assembly of FIG. 2 along section line 3—3;

DETAILED DESCRIPTION OF THE INVENTION

Figure 4:
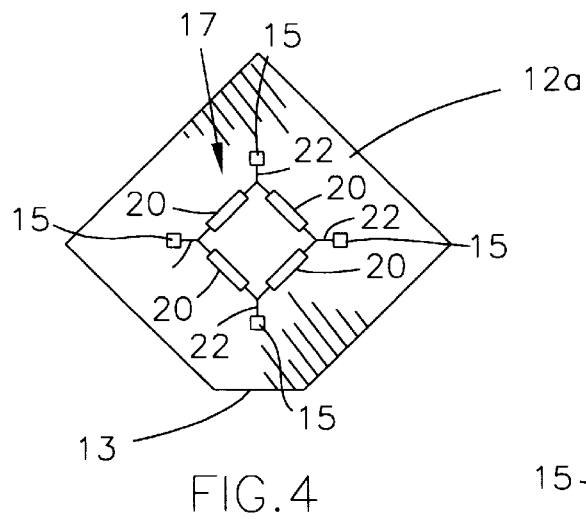
FIGS. 4 and 5 are plan views of alternative diaphragm configurations for the pressure sensor of FIGS. 2 and 3.

FIGS. 2 and 3 represent a pressure sensor 10 that has a metal body 14 and metal diaphragm 16 in accordance with a first embodiment of the present invention. As illustrated, the diaphragm 16 has a square-shaped frame 12 and closes one end of the body 14, which is annular-shaped. The frame 12, body 14 and diaphragm 16 can be fabricated from stainless steel or another suitable material by such conventional methods as grinding, forging, acid etching, or any combination of these techniques. The annular shape of the body 12 is conventional and promotes the reliability of welds that may be required to mount the sensor 10 to another structure. The square-shaped frame 12 of this invention is contrary to the conventional practice of using metal diaphragms with round-shaped frames on round-shaped bases. Sensors with round frames must be continuously monitored to ensure that they have not rotated within their tray or fixture such that proper alignment of the diaphragm is maintained between process levels, as when the diaphragm must be properly aligned during the deposition of a patterned layer. Such a requirement is contrary to a key aspect of this invention which requires a sensor that can be readily mass produced.

With the square-shaped frame 12 shown in FIG. 2, a tray or fixture can be configured to prevent the sensor 10 from rotating during processing.

Figure 5:
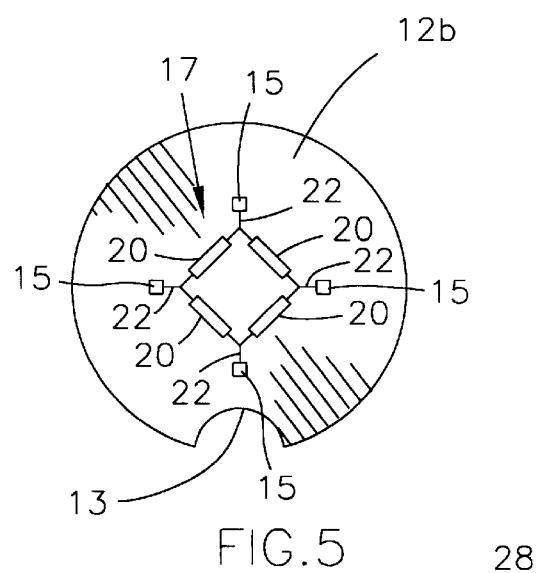
Figure 6:
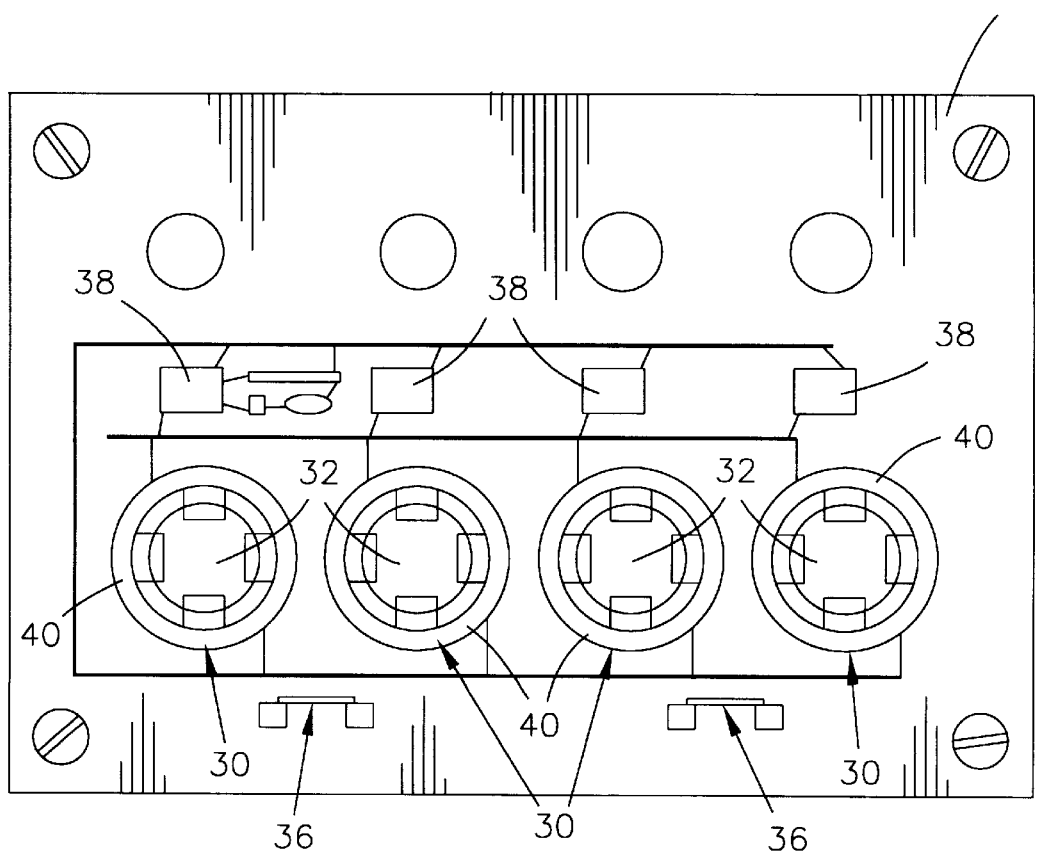
FIG. 6 is a plan view of a plate assembly equipped with integral pressure sensors formed in accordance with this invention.

FIGS. 4 and 5 show alternative configurations for frames in accordance with this invention. In FIGS. 4 and 5, square-shaped and round-shaped frames 12A and 12B, respectively, are shown to have notches 13 that can be used in conjunction with appropriate fixturing to maintain proper orientation of the diaphragm 16. Another solution to the alignment problem is to fabricate multiple diaphragms on a single metal sheet. The individual diaphragms can be separated at the completion of processing or, as depicted in FIG. 6, can remain together to form a multi-sensor 25 unit.

The next processing step is to form a thick-film insulating layer 18, thin-film polysilicon resistors 20, thick-film conductors 22 and a thick-film passivation layer 24 on the diaphragm 16. These layers are represented in FIG. 3, and are formed in accordance with the following process steps that are outlined in FIG. 1. The insulating layer 18 is shown in FIG. 3 as being deposited directly on the metal diaphragm 16. Suitable methods of forming the insulating layer 18 include screen and stencil printing an appropriate thick-film ink on the diaphragm 16, which is then fired to remove the organic constituents of the ink and then annealed at a temperature sufficiently high to reflow the insulating layer 18 and form a smoother surface for the polysilicon resistors 20. Suitable materials for the insulating layer 18 include glass materials known in the art for this purpose, with a suitable thickness range being about one to about ten micrometers.

The insulating layer 18 may be formed of multiple individual layers to reduce pinholes and improve the adhesion, surface smoothness, crack resistance and thermal shock resistance of the insulating layer 18. The first of such layers would be deposited on the diaphragm 16 and be formed of a material chosen for its adhesion to metal. The final insulating layer must form a smooth glazed surface during annealing in order to allow the thin-film polysilicon resistors 20 to be applied. For this reason, the final insulating layer must have a lower glass transition temperature than the previous layers, yet must be stable at the temperature at which the polysilicon for the resistors 20 will be applied, typically about 600° C. In addition, the material for the final insulating layer must not react with polysilicon or the metal used to form the conductors 22.

The thin-film polysilicon for the resistors 20 is then deposited by plasma CVD or another appropriate process to a thickness of about 0.3 to about 1 micrometer. Doping of the polysilicon to achieve the desired conductivity for the resistors 20 can be accomplished by in-situ plasma doping or subsequent ion implantation with boron or phosphorus. Depositing undoped polysilicon allows for a higher deposition rate. In a preferred embodiment, the polysilicon layer is doped in-situ with phosphorus during deposition by plasma CVD. Polysilicon doped in-situ with phosphorus or boron can also be deposited by thermal decomposition, also known as low pressure CVD or LPCVD. All of these processes are known in the art. The significant aspect of this step is the resulting thin-film polysilicon, from which the thin-film resistors 20 are produced having higher gauge factors than thick-film resistors.

The resistors 20 are defined by appropriately patterning the polysilicon layer. Contrary to spun-on liquid photoresists conventionally used in the prior art to pattern thin-film polysilicon, the present invention preferably employs an etch mask formed of dry photosensitive film, though suitable masks can also be formed with screen printed polymer and glass materials. Suitable dry photosensitive film materials are known in the art, an example of which is DYNAMASK available from Morton International. Such films can be used to cover relatively large surfaces, such as when multiple sensors are to be formed in a single metal sheet, as well as multiple individual sensors mounted in a fixture or tray. The film is exposed and developed in accordance with known practices to yield an etch mask that exposes all but those regions of the polysilicon layer intended to form the resistors 20. The polysilicon layer is then etched using a liquid etchant such as potassium hydroxide (KOH) or ethylenediamine pyrocatechol (EDP) or by plasma etching, and the mask removed.

FIGS. 4 and 5 show a symmetric Wheatstone bridge design preferred for the polysilicon resistors 20 of this invention. With the resistors 20 and their associated bond pads 15 in the illustrated Wheatstone bridge pattern 17 (the passivation layer 24 is omitted for clarity), the sensor 10 can be loaded into a fixture without regard to aligning the polysilicon resistor level to the metal and passivation printing levels. This capability is a key feature in low cost, high-volume manufacturing of a sensor.

The metal conductors 22 for connecting the resistors 20 and/or lowering the overall Wheatstone bridge resistance are then formed. The bond pads 15 (FIGS. 4 and 5) can be simultaneously formed with the conductors 22 in the same process using the same materials. The conductors 22 are preferably formed by screen printing a suitable conductive thick-film ink on the insulating layer 18 and resistors 20 as shown in FIG. 3. Suitable materials for the conductors 22 include gold, silver, palladium-silver alloys, platinum, copper, nickel and other traditional thick-film metal materials. To inhibit diffusion of silicon from the resistors 20 into the conductors 22, the conductor ink preferably contains a small amount of silicon powder to yield conductors with a limited amount of silicon, preferably less than 1 weight percent silicon. Alternatively, a silicide such as $Pd_2Si$ or PtSi can be added to the thick-film ink for the conductors 22. The presence of silicon in the conductors 22 is believed to be a key to reliably producing the sensor 10 of this invention. Firing of the conductor ink should not exceed the eutectic temperature of the metal constituent, e.g., a palladium-silicon ink must be kept below 720° C. As with the insulating layer 18, the conductors 22 can be formed of multiple individual layers. For example, the first layer can be formulated to promote adhesion to the insulating layer 18 and resistors 20, while subsequent layers can be formulated to improve bond pad performance and bridge resistance.

The passivation layer 24 is then deposited to enable the sensor 10 and its polysilicon and metal elements to survive in the environment to which the sensor 10 will be subjected. The passivation layer 24 is preferably formed by screen printing an oxide or glass-based thick-film ink that can be fired at a temperature below the eutectic temperature of the metal system of the conductors 22. Alternative passivation materials include silicone-based gels, polymide, parylene or other organic materials.

FIG. 6 represents an application using multiple sensors formed in accordance with this invention. Shown in FIG. 6 is a metal plate 28 in which four sensors 30 are formed. Each sensor 30 includes a metal diaphragm 32 with a thick-film insulating layer, thin-film polysilicon resistors, and thick-film conductors and passivation as described above. The diaphragms 32 can be defined by thinning four regions of the plate 28 by such methods as grinding, forging, acid etching, or any combination of these techniques. O-rings 40 surround each of the diaphragms 32, permitting the plate 28 to be mounted directly to a fluid-containing vessel, such as an anti-lock braking module, forming a wall of the module.

The insulating layer preferably covers the entire surface of the plate 28, allowing other electrical components to be formed on or attached to the plate 28, including metal runners 34 to carry power, ground and signals, metal bond pads for interconnections, resistors, capacitors, inductors and varistors, thermistors 36 for temperature sensing, light sensors, and integrated circuit chips 38. Discrete electronic components such as integrated circuit chips 38 can be mounted to the plate 28 by such methods as solder reflow, wirebonding and flip-chip mounting. Adding these components to the insulated plate 28 has the ability to greatly reduce the overall size of the module.

While our invention has been described in terms of a preferred embodiment, other forms could be adopted by one skilled in the art. For example, in addition to sensing pressure, the teachings of this invention are applicable to strain gauges for load cells, weight sensors and strain sensors. Accordingly, the scope of our invention is to be limited only by the following claims.

What is claimed is:

1. A method of forming a sensor, the method comprising the steps of:

producing a metal body to have a metal diaphragm;

printing a plurality of successive layers of insulator ink on the metal diaphragm, the last such layer being formed of a material having a lower glass transition temperature than the other such layers;

firing the layers of insulator ink to form an insulting layer having a thickness in the range of one to ten micrometers, and then annealing said insulating layer at a temperature sufficient to reflow said last insulating layer and yield a insulative surface with increased smoothness than prior to said annealing;

forming polysilicon resistive elements on the insulating layer;

printing a layer of conductor ink on the insulating layer, in contact with the polysilicon resistive elements, and firing said conductor ink to form conductors electrically coupled to said resistive elements, the conductive ink including a metal powder from the group consisting of silicon powder and silicide powder, thereby to inhibit diffusion of silicon from the resistive elements into the conductors; and depositing a passivation layer over the polysilicon resistive elements and the conductors.

2. A method as recited in claim 1, wherein the passivation layer is deposited by printing an oxide-based or glass-based ink on the polysilicon resistive elements and the conductors, and then firing the ink.

* * * * *